Feb. 18, 1941. K. W. HEDSTROM 2,232,661
VELOCIPEDE
Filed April 21, 1938 2 Sheets-Sheet 1
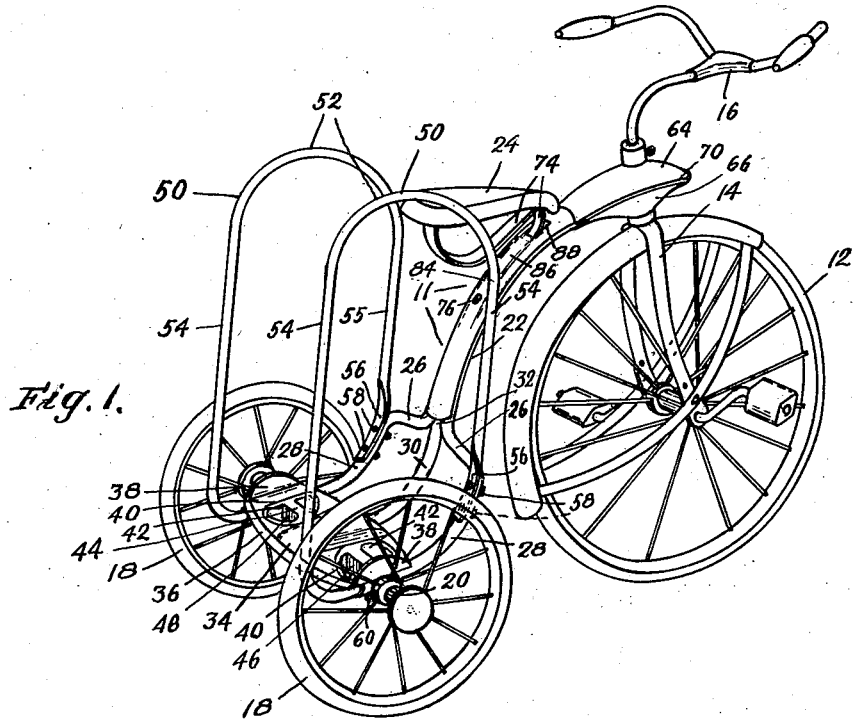
Fig. 1.
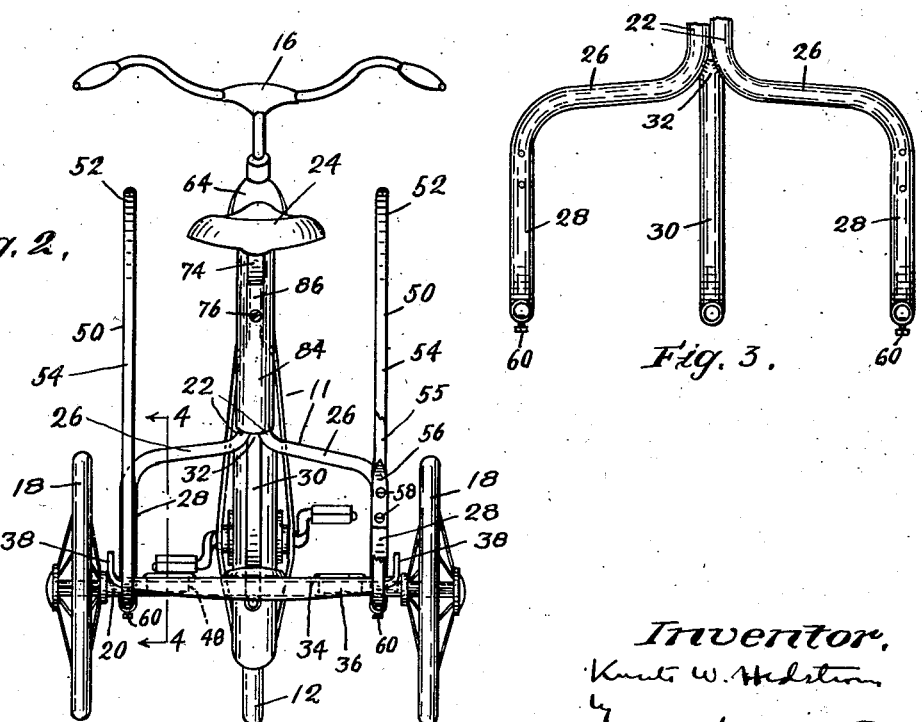
Fig. 2.
Fig. 3.
Inventor,
Knut W. Hedstrom
by
[signature]
atty Feb. 18, 1941. K. W. HEDSTROM 2,232,661
VELOCIPEDE
Filed April 21, 1938 2 Sheets-Sheet 2
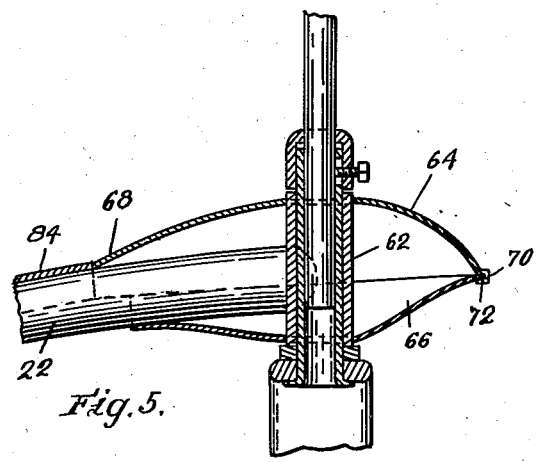
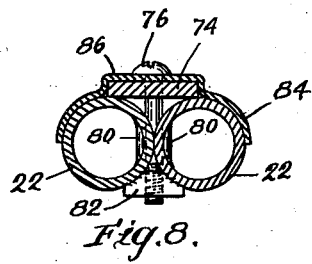
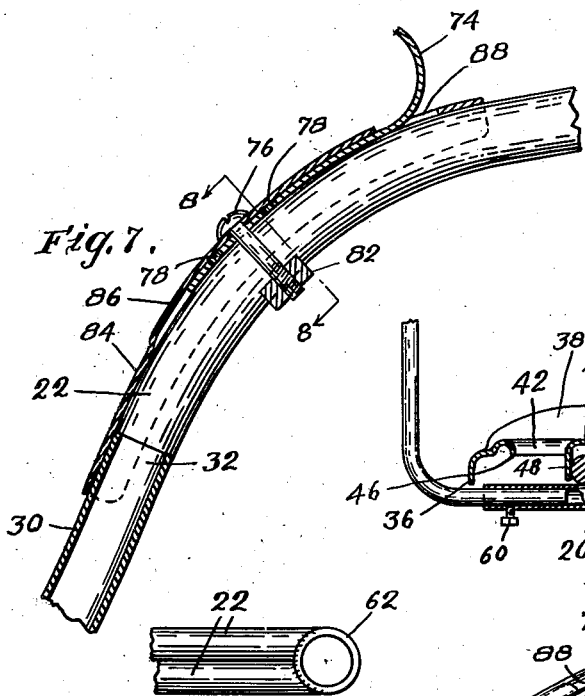
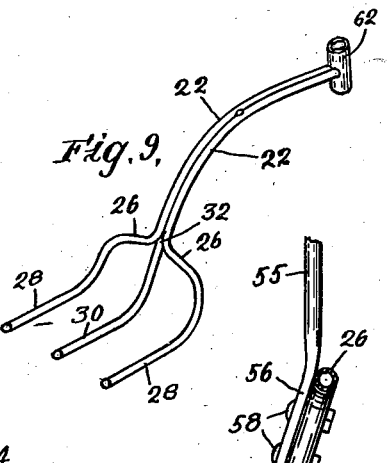
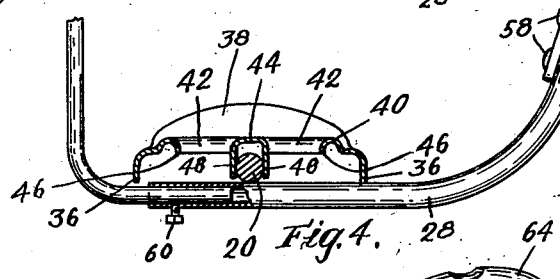
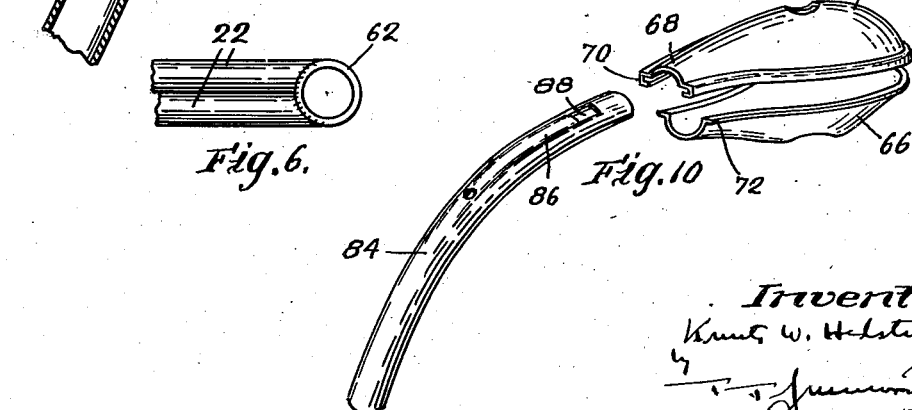
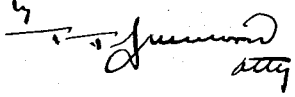
Inventor,
Knut W. Hedstrom Patented Feb. 18, 1941

2,232,661

UNITED STATES PATENT OFFICE 2,232,661

VELOCIPEDE

Knute W. Hedstrom, Gardner, Mass., assignor to Hedstrom-Union Company, Gardner, Mass., a corporation of Massachusetts Application April 21, 1938, Serial No. 203,374

3 Claims. (Cl. 280—282)

This invention relates to velocipedes.

It is quite common for the driver of a velocipede to carry a passenger on or over the rear axle and, in fact, it is now usual for a velocipede to have step plates that provide a broad support for the foot of the passenger. A passenger retains his position on the velocipede by his grasp on the driver. Thus his hold is somewhat uncertain and can interfere at times with the driver's manipulation of the velocipede and hence can be a cause of accident.

Thus an object of the present invention is to provide a velocipede with hand grips for the passenger, the grips preferably being so arranged that not only can the passenger maintain himself upright readily on the velocipede but also that they can be grasped readily by the passenger when the velocipede is in motion so that the passenger can pull himself aboard, the hand grips also serving as side guards for the passenger.

Another object of the invention is a novel form of velocipede backbone and housing therefor.

A yet further object of the invention is a novel form of step plate and means for securing the plate to the rear axle.

A further object is generally to improve the construction of velocipedes.

Fig. 1 is a perspective view of a velocipede embodying the present invention.

Fig. 2 is a rear view of the velocipede of Fig. 1.

Fig. 3 is a detail rear view of the rear portion of the backbone illustrating the construction thereof.

Fig. 4 is a sectional detail taken along line 4—4 of Fig. 2.

Fig. 5 is a sectional elevation through the longitudinal line of the backbone at the steering post end thereof.

Fig. 6 is a plan detail of the steering post end of the backbone.

Fig. 7 is a longitudinal sectional view through the backbone and the seat support.

Fig. 8 is a sectional view taken along line 8—8 of Fig. 7.

Fig. 9 is a perspective view of the backbone with the covers removed.

Fig. 10 is an exploded perspective view of the backbone covers.

As herein shown the velocipede comprises the backbone 11, the front or steering wheel 12 with its fork 14, handle bar 16, and the rear wheels 18 on the axle 20.

The backbone includes a pair of tubes 22 which are parallel and close to each other in the fore-part of the frame and under the seat 24 and are arcuately curved in a vertical plane and at the rear part have the outwardly divergent tine-sections 26 and are substantially at right angles with the fore-portion of the backbone. The tubes at the outer ends of the intermediate parts 26 are bent downwardly into spaced parallel relation with each other as at 28 and are curved downwardly in a vertical plane and become horizontal at the rear axle 20 where they are close to the rear wheels. A third tube 30, see especially Figs. 1, 3 and 9, is disposed midway between the tube portions 28 and is curved similarly thereto and has its upper end 32 located in the bight between the parallel portions of the fore-part of the tubes and is welded rigidly thereto. The rear axle preferably although not necessarily overlies the horizontal parts of the backbone tines, that is to say, the parts 28 and 30 of the backbone and is welded thereto.

A foot or step plate 34 overlies the rear axle and the tines. Said step plate is provided with downturned front and rear flanges 36 and upturned end flanges 38. The step plate is also provided with oval shaped raised foot pads 40 which have front and rear apertures 42 and an integral center bridge 44, see Fig. 4. The apertures 42 are provided with downturned lips 46 and the bridge member 44 is provided with downturned lips 48 struck out of the material occupying the apertures 42. The lips 48 form a channel between which the rear axle 20 is located and are welded to the axle, thereby securing the foot plate to the velocipede. The front flange 36 rests upon the tops of the tines. The rear ends of the tines are terminated under the step plate.

The velocipede is provided with a pair of hand grips 50 for the passenger. These grips are in the form of elongated loops composed of tubular stock having semi-circular parts 52 at the top and vertical parallel rear and front sides 54 and 55, respectively. The lower ends of the front parts 55 have flattened sections 56 which are secured to the rear face of the two outer tines 28 detachably by bolts 58. The lower ends of the rear parts 54 are bent inwardly and horizontally to underlie the foot plate 34 and are located removably within the ends of the tubular outer tines 28 and are secured removably therein by set screws 60. The hand grips thus are located adjacent the rear wheels at the respective end parts of the foot plate and provide room between them for the passenger. The grips extend upwardly to about or slightly above the level of the seat 24 and thus form guards preventing the passenger from falling sidewise off the step plate. The grips are high enough to be grasped readily by the passenger so that he need not touch the driver. The grips or the vertical parts 54 thereof are located a substantial distance in the rear of the step plate so that a passenger can grasp the grips and board the velocipede when it is in motion if he desires to do so. The hand grips 50 are also spaced outwardly of the sides of the seat 24 sufficiently so that the driver can mount the seat from the step plate 34.

The front ends of the backbone tubes 22 are abutted against the middle part of the steering fork tube 62, see Fig. 6, and are welded thereto. The front end of the tubes and the steering fork tube are enclosed within a housing comprised preferably of the upper part 64 and the lower part 66 which are made preferably of pressed sheet metal and are apertured to receive the upper and lower end parts of the steering fork tube and to conceal the joint between the steering post and the backbone tubes. The rear parts of the section 64 and 66 are preferably conformed to the configuration of the tubes 22 and the upper sections 64 and 66 are preferably conformed to the further than the corresponding part of the lower section. The sections 64 and 66 have circumferentially outstanding lips 70 and 72, respectively which contact each other and the lip 70 is folded over the lip 72 thereby to secure the parts together about the tube.

The seat 24 is supported upon a seat post comprising a resilient flat springy bar 74 which lies upon the top faces of both backbone tubes 22 as is illustrated in Figs. 7 and 8, and is secured to the tubes by a screw 76 which passes through any one of a plurality of apertures 78 in the bar 74 and through a passage formed by confronted indented parts 80 of the backbone tubes and is screw-threaded into a nut 82 preferably welded or otherwise connected to the backbone tubes.

The intermediate part of the backbone is provided with a top cover 84 which extends from approximately the junction of the tines 28 and 30 with the narrow part of the backbone up to the front housing plate 64. The cover 84 overlies and is in contact with substantially the top half of the tubes of the front part of the backbone and is provided on the top thereof with a flat longitudinally elongated rib 86 constituting an internal channel in which the seat bar 74 is located. The cover 84 is clamped to the backbone by the aforesaid seat post securing screw 76. The raised rib is so shaped as to engage the top faces of the side edge portions of the seat bar 74 and to hold the corresponding under faces upon the tops of the tubes 22 so that the bar cannot rock about a longitudinal axis. The sides of the cover 84 overlie the sides of the backbone which thus hold the cover against lateral displacement. The cover 84 is provided with an elongated slot 88 at the front end of the raised rib 86 through which the seat post extends and in which the seat post may be adjusted vertically and longitudinally.

I claim:

1. In a velocipede having a rear axle, rear wheels thereon, a front wheel fork, a front wheel therein, the combination therewith of a backbone having a fork tube in which the fork is journalled, said backbone comprising two tubular members spaced apart at and carrying said rear axle and having generally horizontal spaced parts and upwardly and forwardly inclined portions located forwardly of the rear axle and connected therewith and close together forwardly of said rear axle and extending close together over said front wheels to said fork tube, a step on the rear axle between said spaced apart portions of said tubular members, a seat on the backbone where the tubes are close together, and a pair of laterally spaced hand grips each comprising a pair of front and rear members fixed directly to the rear axle supporting part of one of said tubular members adjacent to the rear wheels, said hand grips being located on opposite sides of said step and extended upwardly above said tubular members and having at their upper ends and integrally therewith forwardly and rearwardly extending interconnections therebetween, the lower end portions of the front members being fixed directly to the forwardly and upwardly inclined portions of the spaced apart tubular members, the hand grips being located between the rear wheels and outstanding beyond the sides of the seat to permit a rider to mount the seat from a position between the hand grips.

2. A velocipede having a seat-carrying backbone provided with a pair of spaced members at its lower end that have connection with the axle, and a pair of guard members laterally spaced to receive a rider therebetween, said guard members having spaced continuous sides, one of the ends of each of which is directly connected to the said respective spaced members of the backbone and the opposite ends of each of which have direct connection with the free ends of the backbone, said guard members having hand grips at their upper portions disposed on opposite sides of the seat whereby to provide for a rider mounting the seat from a position between the hand grips.

3. A velocipede in accordance with claim 2, wherein the lower ends of the backbone members are tubular and wherein the guard members are of substantially inverted U-shape and have the lower ends of their rear sides extended forwardly at an angle and received within the tubular members of the backbone.

KNUTE W. HEDSTROM.

CERTIFICATE OF CORRECTION.

Patent No. 2,232,661.  February 18, 1941.

KNUTE W. HEDSTROM.

It is hereby certified that error appears in the printed specification of the above numbered patent requiring correction as follows: Page 2, first column, lines 22 and 23, for "sections 64 and 66 are preferably conformed to the" read --section 64 has a rear part 68 that extends rearwardly--; and that the said Letters Patent should be read with this correction therein that the same may conform to the record of the case in the Patent Office.

Signed and sealed this 25th day of March, A. D. 1941.

Henry Van Arsdale,
Acting Commissioner of Patents.

(Seal)